United States Patent [19]

Chamblee

[11] Patent Number: 4,689,865

[45] Date of Patent: Sep. 1, 1987

[54] SNAP RING TOOL

[76] Inventor: Henry F. Chamblee, 906 Taylor St., Sulphur, La. 70663

[21] Appl. No.: 918,524

[22] Filed: Oct. 14, 1986

[51] Int. Cl.$^4$ .................................. B23P 19/04

[52] U.S. Cl. .................................. 29/229; 81/303

[58] Field of Search ................. 81/486, 485, 302, 303, 81/305, 306, 311; 29/229, 223, 222, 243.56

[56] References Cited

U.S. PATENT DOCUMENTS

| | | | |
|---|---|---|---|
| 1,303,458 | 5/1919 | Bretz, Jr. | 29/223 |
| 1,645,200 | 10/1927 | Madden | 29/223 |
| 4,280,265 | 7/1981 | Murphy | 29/229 |

FOREIGN PATENT DOCUMENTS

| | | | |
|---|---|---|---|
| 395278 | 7/1933 | United Kingdom | 81/305 |
| 614936 | 7/1978 | U.S.S.R. | 81/302 |

*Primary Examiner*—Roscoe V. Parker

*Attorney, Agent, or Firm*—Brady, O'Boyle & Gates

[57] ABSTRACT

A tool for selectively installing or removing snap rings and C-rings wherein a pair of elongated, spaced, parallel, spring-biased arms are pivotally connected to a mounting plate. One end of each arm has an axially extending pin insertable into the apertures of a conventional snap ring and the opposite end of each arm is provided with a recess adapted to receive the free ends of a conventional C-ring. By squeezing the recessed ends of the arms in a direction toward each other, the pin ends of the arms are moved outwardly relative to each other to thereby spread a snap ring mounted thereon for external mounting to an operative position. By squeezing the pin ends of the arms in a direction toward each other, the recessed ends are moved outwardly relative to each other to thereby spread a C-ring mounted thereon. A manually actuated cam is rotatably mounted on the mounting plate in the space between the arms and is constructed and arranged so that rotation of the cam will cause the pin ends of the arms to move in a direction toward each other to thereby contract a snap ring mounted thereon for internal mounting to an operative position.

6 Claims, 13 Drawing Figures

FIG.1
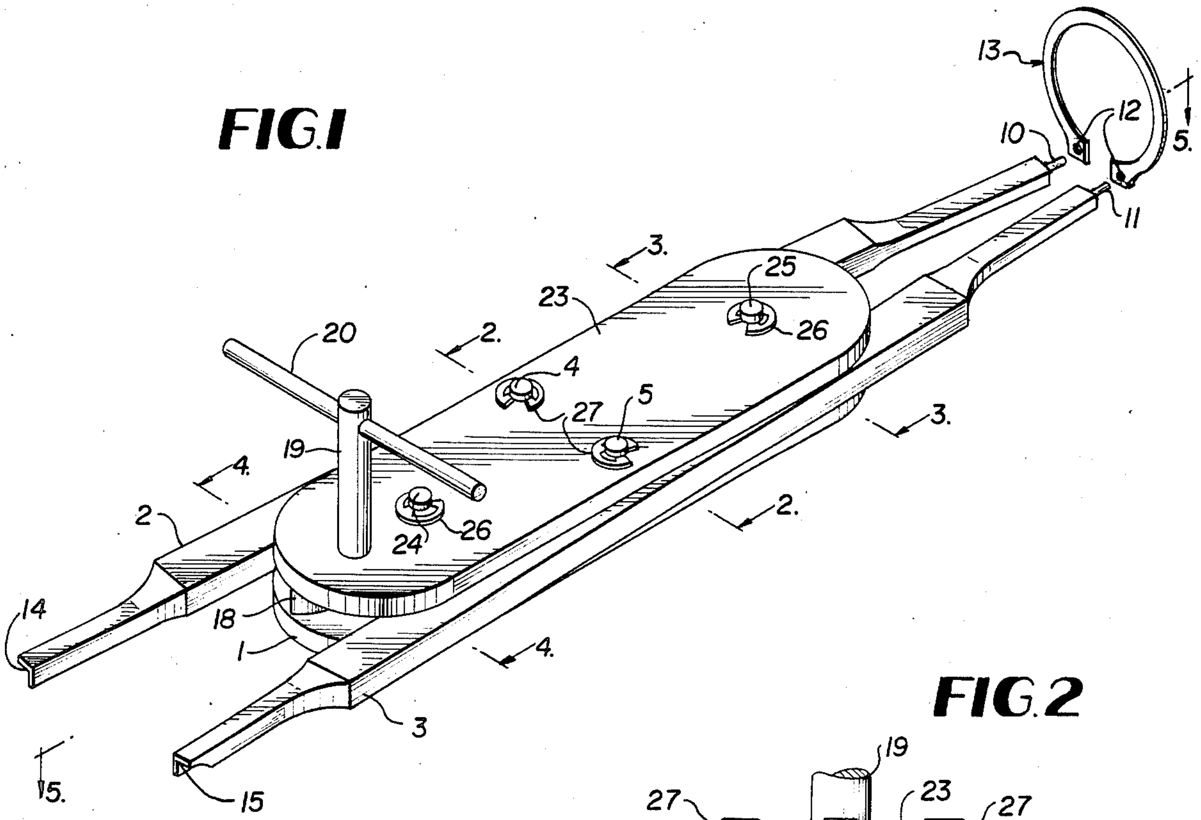
FIG.2
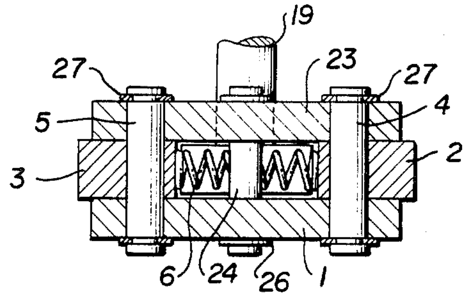
FIG.3
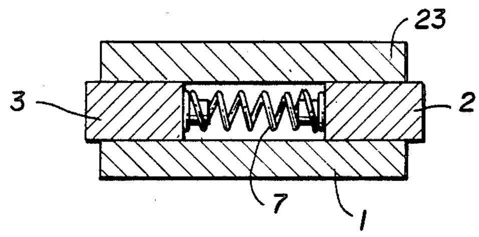
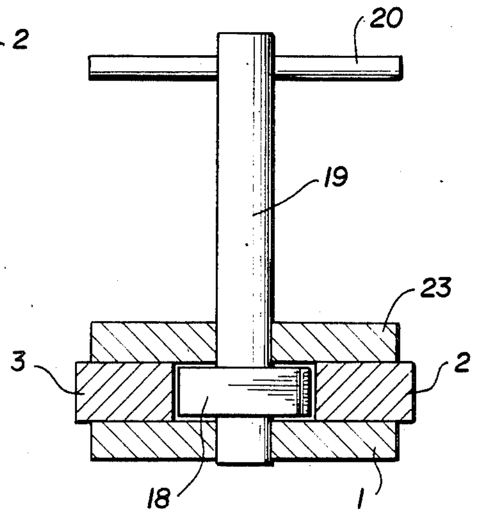
FIG.4

FIG. 7
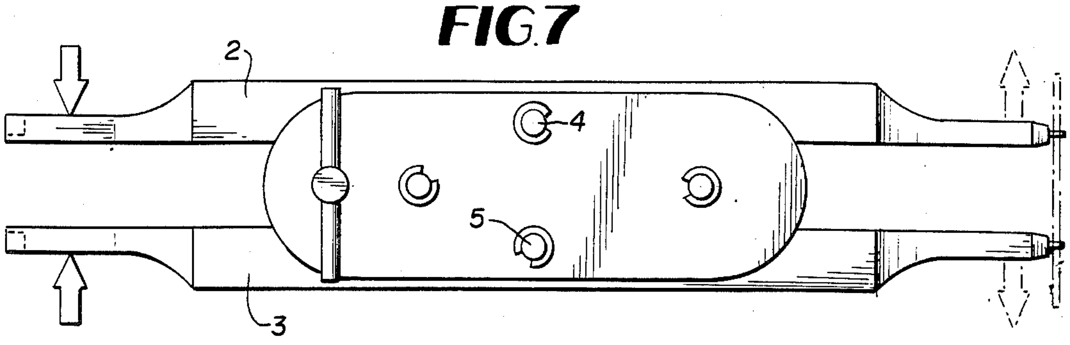
FIG. 7A
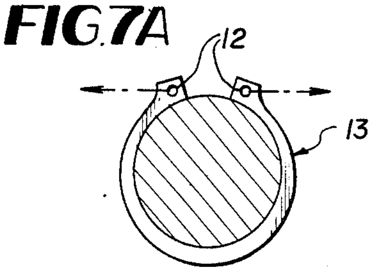
FIG. 8
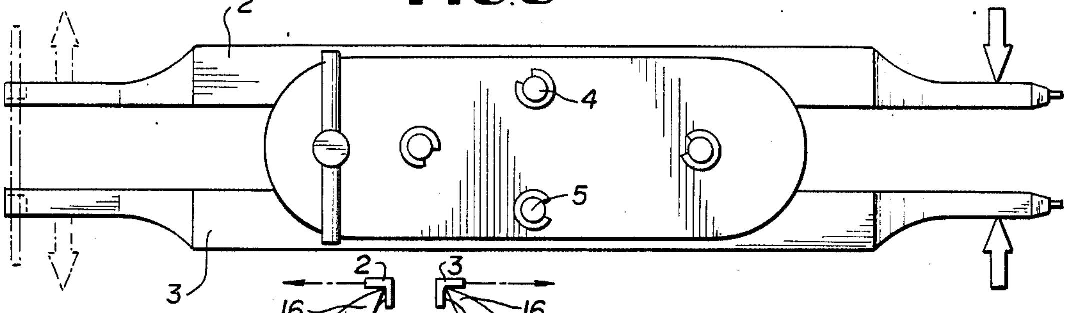
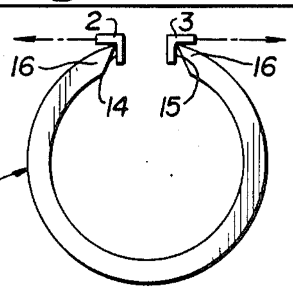
FIG. 8A
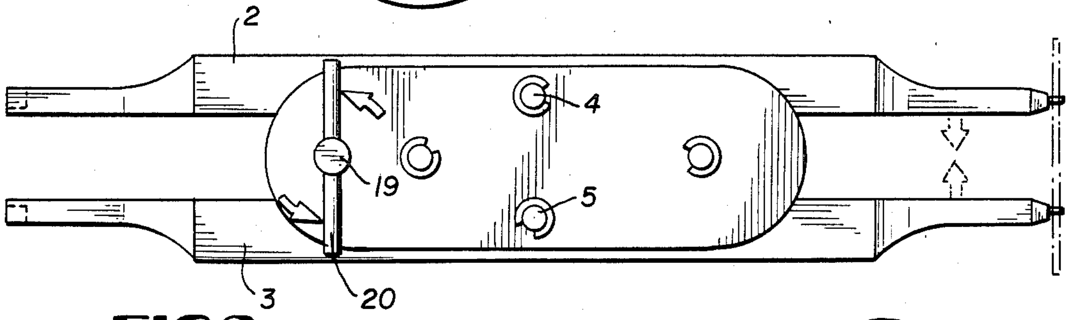
FIG. 9
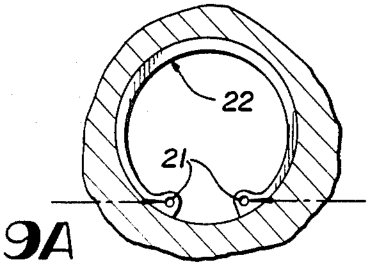
FIG. 9A

SNAP RING TOOL

BACKGROUND OF THE INVENTION

Various tools have been proposed to facilitate the manipulation of conventional snap rings and C-rings in their installation or removal from operative positions. These tools usually are of the plier-type having pins insertable into the apertures provided in conventional snap rings. One tool is usually employed for manipulating external snap rings; another tool is employed for manipulating an internal snap ring, and if the job required the removal or installation of a C-ring, a third tool designed specifically for this type of fastener had to be used.

Attempts have been made to devise a tool for use with conventional external and internal snap rings but these tools required a reconstruction of the tool before it could be converted from an external snap ring tool to an internal snap ring tool.

To overcome the disadvantages experienced in hitherto employed snap ring tools, the tool of the present invention has been devised for manipulating conventional external and internal snap rings without requiring a reconstruction of the tool for converting from one type of tool to another.

The tool of the present invention comprises, essentially, a pair of elongated, spaced, parallel, spring-biased arms pivotally connected to a mounting plate. One end of each arm has an axially extending pin adapted to be inserted into the apertures of a conventional snap ring and the opposite end of each arm is provided with a recess adapted to receive the free ends of a conventional C-ring. By using the recessed ends of the arms as a handle and squeezing the arms in a direction toward each other, the pin ends of the arms are moved outwardly relative to each other, to thereby spread a snap ring carried thereon for external application. By using the pin ends of the arms as a handle and squeezing the arms toward each other, the recessed ends are moved outwardly relative to each other to thereby spread a C-ring carried thereon.

A manually actuated cam is rotatably mounted on the mounting plate on a side of the pivot connection opposite to the pin ends of the arm, whereby upon rotation of the cam, the pin ends of the arms are moved in a direction toward each other, to thereby contract a snap ring carried thereon for internal application.

BRIEF DESCRIPTION OF THE DRAWINGS

FIG. 1 is a perspective view of the tool of the present invention;

FIG. 2 is a view taken along line 2—2 of FIG. 1;

FIG. 3 is a view taken along line 3—3 of FIG. 1;

FIG. 4 is a view taken along line 4—4 of FIG. 1;

FIG. 7 is a top plan view of the tool showing the operation thereof for manipulating the external snap ring of FIG. 7*a;*

FIG. 8 is a top plan view of the tool showing the operation thereof for manipulating the split C-ring of FIG. 8*a;*

FIG. 9 is a top plan view of the tool showing the operation thereof for manipulating the internal snap ring of FIG. 9*a.

DESCRIPTION OF THE PREFERRED EMBODIMENT

Figure 5:
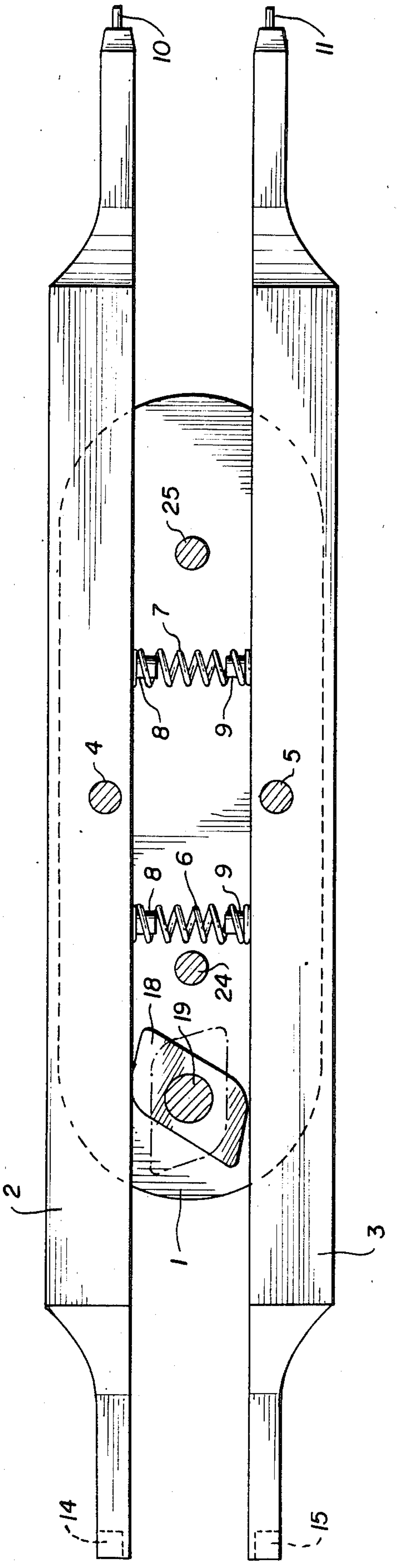
FIG. 5 is a view taken along line 5—5 of FIG. 1.

Referring to the drawings and more particularly to FIGS. 1 and 5, the snap ring tool of the present invention comprises a mounting plate 1 having a pair of elongated, spaced, parallel arms 2 and 3 pivotally connected to the mounting plate as at 4 and 5. The arms 2 and 3 are biased to the parallel position with respect to each other by transversely extending springs 6 and 7 held in the operative position by opposed bosses 8 and 9 extending inwardly from the arms 2 and 3, respectively. One end of each of the arms 2 and 3 is provided with an axially extending pin 10, 11 adapted to be inserted into the apertures 12 of a conventional snap ring 13, the opposite end of each of the arms being provided with a recess 14, 15 adapted to receive the ends 16 of a conventional C-ring 17, as shown in FIG. 8*a.*

In the operation of the tool thus far described, the manipulation of the tool for external installation of the snap ring 13 on a shaft 18 is shown in FIGS. 7 and 7*a.* The recessed ends of the arms 2 and 3 are used as a handle and manually squeezed in a direction of the solid arrows to thereby spread the pin ends of the arms in a direction of the dotted line arrows, whereby the apertured ends 12 of the snap ring 13, carried by the pins 10 and 11, are spread outwardly as shown in FIG. 7*a.*

To install the C-ring 17, the ends 16 thereof are received in the respective recesses 14 and 15 of the arms 2 and 3, as shown in FIGS. 8 and 8*a,* and by employing the pin ends of the arms 2 and 3 as a handle, the arms are manually squeezed together in the direction of the solid line arrows, as shown in FIG. 8, to thereby spread the recessed ends of the arms in a direction of the dotted line arrows, whereby the ends 16 of the C-ring 17 are spread outwardly, as shown in FIG. 8*a.*

Returning to the structural description of the tool of the present invention, as shown in FIGS. 1 and 5, a cam 18 is secured to a shaft 19 rotatably mounted in the base plate 1 and extending upwardly therefrom, the extended end of the shaft being adapted to receive a handle 20. The cam 18 is positioned on the mounting plate 1 so that the pivot connections 4 and 5 of the arms 2 and 3 are interposed the cam 18 and the pin ends 10, 11 of the arms. The profile of the cam 18 is configured so that rotation of the cam 18 in a counter-clockwise direction, as shown in FIG. 9, will cause the pin ends of the arms 2 and 3 to move in a direction toward each other as shown by the dotted line arrows, to thereby cause the apertured ends 21 of an internal snap ring 22 to move in a direction toward each other as shown in FIG. 9*a.*

The shaft 19 to which the cam 18 is secured is freely rotatable within the mounting plate 1 so that manipulation of the tool for installing or removing the external snap ring 13 or C-ring 17 by squeezing the respective ends of the arms as described hereinabove in connection with FIGS. 7 and 8 will cause the cam 18 to rotate to a dotted line position as shown in FIG. 5, to thereby not interfere with the relative movement of the arms 2 and 3 toward each other.

To complete the structure of the tool of the present invention, a cover plate 23 is superimposed on the arms 2 and 3 and secured to the mounting plate 1 by a pair of axially spaced pins 24, 25 secured in a fixed position by suitable fasteners 26. While the spaced pins 24, 25 extend only through the mounting plate 1 and cover plate 23, the pivotal connections 4 and 5 extend through the mounting plate 1, arms 2 and 3, and cover plate 23, as shown in FIG. 2, and secured in an operative position by fasteners 27.

Figure 10:
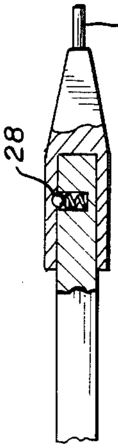
* and FIG. 10 is a fragmentary sectional view showing an embodiment of the tool tip wherein the tool tip is replaceable.
Figure 6:
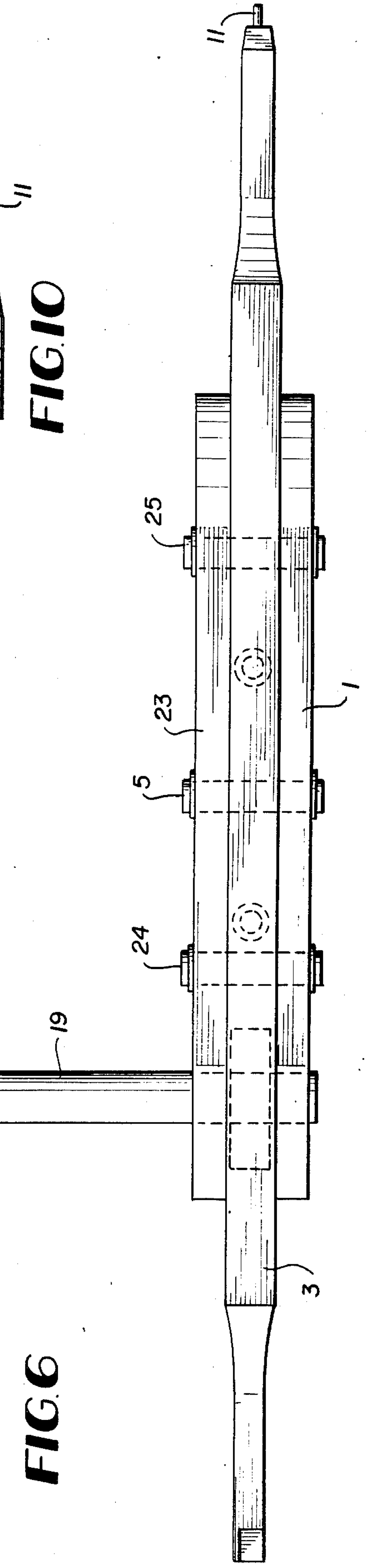
FIG. 6 is a side elevational view of the tool.

The axially extending pins 10 and 11 may be integrally connected to their respective arms as shown in FIG. 5: or they can be detachably connected to the arm by a spring-biased detent assembly 28 as shown in FIG. 10, to thereby facilitate replacing worn pins or using pins of various sizes, depending on the size of the snap ring apertures.

From the above description, it will be appreciated by those skilled in the art that the present invention provides an improved tool for the selective manipulation of internal and external snap rings, as well as conventional C-rings, without requiring a restructuring of the tool to convert it for use with one or the other type of rings. The elongated arms 2 and 3 not only facilitate use of the tool for manipulating the rings in hard-to-get-to locations, but also provide increased lever arms for spreading or contracting the ends of the rings with a minimum of effort by the operator.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A tool for selectively installing or removing conventional apertured snap rings and split C-rings, comprising, a mounting plate, a pair of elongated, spaced, parallel arms, means pivotally connecting said arms to said mounting plate, an axially extending pin secured to one end of each of the arms adapted to be inserted into the apertures of a conventional snap ring, and a recess provided in the other end of each of said arms adapted to receive the split ends of a conventional C-ring, whereby, an external snap ring can be manipulated by manually squeezing the recessed ends of the arms in a direction toward each other to spread the pin ends of the arms, to thereby expand the external snap ring; a C-ring can be manipulated by manually squeezing the pin ends of the arms in a direction toward each other to spread the recessed ends of the arms, to thereby expand the C-ring.

2. A tool according to claim 1, wherein spring means are mounted in the space between the arms for biasing the arms to the parallel position.

3. A tool according to claim 1, wherein cam means are rotatably mounted on said mounting plate, the pivotal connection means of the arms to the mounting plate being interposed said cam means and the pin ends of said arms, said cam means being profiled to engage said arms upon rotation of said cam means, to thereby cause said pin ends of the arms to move in a direction toward each other, whereby an external snap ring can be manipulated.

4. A tool according to claim 3, wherein the cam means comprises a cam member, a shaft secured to said cam member, one end portion of said shaft being freely rotatable in said mounting plate, and a handle secured to the opposite end portion of said shaft, whereby the cam can be manually rotated.

5. A tool according to claim 4, wherein a cover plate is superimposed said elongated arms and spaced from the mounting plate, and fastening means connecting said cover plate to said mounting plate.

6. A tool according to claim 1, wherein means are provided on the ends of the elongated arms for releasably connecting the pins thereto, whereby the pins may be replaced.

* * * * *